Patented July 11, 1950

2,515,096

UNITED STATES PATENT OFFICE 2,515,096

PROCESS OF FRACTIONATING STARCH

Thomas John Schoch, La Grange, Ill., assignor to Corn Products Refining Company, New York, N. Y., a corporation of New Jersey No Drawing. Application May 17, 1949, Serial No. 93,853

11 Claims. (Cl. 127—71)

This invention relates to a method of fractionating starch.

According to present concepts of the chemistry of starch, most natural starches are now considered to be mixtures of two types of polymers; one is essentially linear in molecular configuration and is referred to herein as the A-fraction; and the other, the major portion, is highly branched in molecular configuration and is referred to herein as the B-fraction.

Various methods have been proposed in the past for the separation of the A-fraction and the B-fraction of starch. One method proposed consists of saturating an autoclaved starch solution with n-butyl or n-amyl alcohol, whereby the A-fraction precipitates as an insoluble crystalline complex with the alcohol (Schoch, Cereal Chemistry, 18, 127-128 (1941)). After removal of the A-fraction by the use of a supercentrifuge, the B-fraction was recovered from the mother liquor by addition of an excess of methanol. By a later alternative method the starch was autoclaved in water which had been saturated with butyl alcohol to effect solution of the starch, then the starch solution was cooled to room temperature to precipitate the A-fraction (Schoch, J. Am. Chem. Soc. 64, 2957-2961 (1942)). Attempts to precipitate the B-fraction, remaining in solution after removal of the A-fraction, by refrigeration or long standing were not successful.

While the above procedures are satisfactory on a laboratory basis, they are not economical for large scale processing. Large quantities of methanol are required to precipitate the B-fraction from solution and the methanol must be recovered from a ternary mixture containing water and butyl alcohol. Alcoholic flocculation of the B-fraction might be omitted and the latter substance recovered by spray-drying or roll-drying the centrifugate. However, the steam costs involved for drying would be prohibitive and difficulties would be encountered in the recovery of butyl alcohol remaining in the centrifugate.

An object of the present invention is to provide an improved process for the fractionation of starch into its A- and B-fractions. A further object is to provide a continuous process for the fractionation of starch.

I have made the surprising discovery that starch may be fractionated into its A- and B-fractions by dissolving starch in a suitable medium and causing the fractions of the starch to precipitate at different temperature levels. More specifically, a solution of starch is effected, at elevated temperature, in a suitable alcohol-water medium, the solution cooled sufficiently to precipitate the A-fraction, the A-fraction separated, the remaining liquor subsequently cooled to precipitate the B-fraction and the B-fraction separated.

In carrying out the process of the present invention, it is preferable to paste the starch in a hot aqueous alcohol mixture of desired concentration to be hereinafter specified and then effect solution of the swollen starch by autoclaving or by prolonged boiling under reflux. As an alternative procedure, the starch may be pasted in hot water, autoclaved or boiled to effect solution of the starch granules and then alcohol added to give the desired concentration. The first method is preferred by reason of the fact that dissolution of the swollen granules is more readily effected in the presence of moderate amounts of the lower alcohols. As a further advantage, the first method affords a better fractionation of those cereal starches which contain a small amount of natural fatty acid. Such lipid materials tend to inhibit swelling and solution of the starch granule and it is, therefore, advisable to use defatted starch when operating by the second method. When raw cereal starch is pasted in aqueous alcohol, the latter appears to dissolve the liquid material and prevent its undesirable effect on the starch. The addition of a small amount of electrolyte, e. g., sodium chloride, to the solution of starch appears to assist the formation of the A-fraction complex in crystalline form. To avoid degradation of the starch substance it is preferable to maintain the pH value of the solution of starch within the range of 5.9 to 6.3.

After the solution of starch in the aqueous alcohol has been effected, the solution is cooled sufficiently to precipitate the A-fraction. While precipitation usually occurs in the range of 50 to 70° C. (except when tertiary amyl alcohol is used and precipitation occurs at 90 to 100° C.) the usual practice is to cool the solution to room temperature before removing the A-fraction. It is advisable to stir the system continuously during the cooling period.

After the A-fraction complex is precipitated, it may be separated by various means, for example, the use of a continuous flow supercentrifuge, preferably of a vapor-sealed type to minimize evaporation of alcohol. When low concentrations of starch are employed, the A-fraction may be separated by simple sedimentation or the system may be allowed to settle, the supernatant liquid removed and the heavy slurry of A-fraction material passed through a supercentrifuge.

After the A-fraction has been removed, the resulting solution containing the B-fraction is then cooled below room temperature by suitable means as, for example, by means of refrigerated coils or by the addition of ice. Usually the B-fraction flocculates spontaneously by the time the temperature of the solution is lowered to 3 to 4° C., although occasionally agitation may be required to initiate flocculation. While it may be advantageous to cool the system as low as possible, in no case does this invention contemplate freezing of the solvent medium.

The B-fraction usually precipitates as a fairly compact curd and the supernatant liquor may be readily drawn off or decanted. In some cases, the floc of the B-fraction remains suspended and must be recovered by such means as centrifugation. Once the B-fraction has been precipitated by refrigeration, subsequent operations may be conducted at room temperature since the precipitated B-fraction does not redissolve when the system returns to 20 to 30° C.

When starch is fractionated in accordance with the principles of the prevent invention, the A- and B-fractions are recovered as wet precipitates, which may be used as such or which may be dried by any suitable means.

The principles of the present invention are applicable to corn starch, tapioca starch, potato starch, sago starch, sorghum starch and any other granular starches containing substantially "normal" amounts of A-fraction (viz. 15 to 35%). Such starches may be in the raw, unmodified form or they may be modified in conventional manner to render them thin boiling, e. g. with acid preferably below the gelatinization temperature, or they may be hydrolyzed in the pasted or gelatinized state to render them thin boiling, e. g. with acid or enzyme. "So-called" white dextrines made in accordance with conventional procedures may also be used.

Since the aforementioned methods of modifying starches, if carried too far will destroy the A-fraction, precautions must be taken not to destroy so much of the A-fraction as to make it uneconomical and impracticable to separate the A-fraction remaining from the B-fraction. The present invention is applicable as long as there is any A-fraction in the starch, but it is uneconomical and impracticable to use starch containing less than two-thirds of the A-fraction originally present.

For the purposes of insuring that the A-fraction of the starch which has been modified to render it thin boiling has not undergone excessive destruction, the iodine affinity may be used as a criterion of the amount of A-fraction in the starch. The iodine affinity of a modified corn starch should preferably not be below 3.5 percent, as compared with 5.3 percent, for unmodified corn starch in order to obtain satisfactory results from an economical point of view.

The term "thin boiling starches," as used herein, is intended to include those starches, the paste viscosity of which has been reduced without substantial impairment of the A-fraction. The term includes "thin boiling starches" having a fluidity range of 20 to 90 (method of Buel, Original Communications, 8th International Congress of Applied Chemistry, vol. XIII, page 63 (1911-12)) made by modifying starch with acid in the wet state below the gelatinization temperature. It also includes starches which have been modified to a comparable degree by conversion of gelatinized pastes with acid or enzyme. The term "white dextrine," as used herein, is intended to refer to the so-called white dextrines made in conventional manner by heating starch in the dry state with acid to reduce the paste viscosity below that of raw starch, but without substantial impairment of the A-fraction.

Any aliphatic alcohol containing from 1 to 5 atoms of carbon or mixtures thereof having prerequisite solubility characteristics in water may be used for purposes of the present invention. The total amount of alcohol or of combined alcohols dissolved in the aqueous phase of the mixture of alcohol and water, in which solution of starch is effected, should be about 10 to 15 volume percent at 0° C. Among the alcohols which are satisfactory for purposes of the present invention are methanol, ethyl alcohol, n-propyl alcohol, isopropyl alcohol, secondary butyl alcohol, tertiary butyl alcohol, and tertiary amyl alcohol.

Methanol and ethyl alcohol are not quite as effective in the process of the present invention as are the other mentioned alcohols.

Tertiary butyl and amyl alcohols impede solution of starch, hence it is usually necessary to cook the mixture of starch and the tertiary alcohol under pressure.

Among the alcohols which may be used in combination with the first mentioned alcohols are isobutyl alcohol, n-amyl alcohol, isoamyl alcohol and pentanol-3. The term aliphatic alcohol, as used herein, is intended to include the mixture of alcohols referred to above. The terms referring to dissolving starch and effecting a solution of starch, as used herein, are intended to include the methods specified hereinabove.

For successful practice of the present invention, the concentration of alcohol in the alcohol and water mixture (which is usually a solution depending upon the solubility of the alcohol in water) must be maintained within certain limits. If the concentration of the alcohol is too low, the A-fraction may be satisfactorily precipitated on cooling the solution to room temperature but flocculation of the B-fraction will not be effected by subsequent cooling. On the other hand, if the concentration of alcohol is too high, the entire starch substance is precipitated at or above room temperature and no fractionation is obtained.

The minimal amount of alcohol which may be employed in accordance with the principles of the present invention may range from about 10 to about 15 volume percent. The amount of alcohol employed must not be sufficient to precipitate the B-fraction at a temperature of 20 to 40° C. The maximal amount of alcohol may range from about 25 to 35 volume percent. More specifically the maximal working concentration is approximately 25 volume percent for methanol, 30 volume percent for ethyl alcohol, 35 volume percent for n-propyl and isopropyl alcohols and 25 volume percent for tertiary butyl alcohol. Due to their limited solubility, there is no detrimental effect in the use of excess secondary butyl or tertiary amyl alcohols. However, only that portion of the alcohol dissolved in the aqueous phase of the alcohol and water mixture is effective in precipitating the B-fraction.

Optimal operation is generally effected with median concentrations of the alcohol, e. g., 25 to 30 volume percent for n-propyl alcohol, 20 to 25 volume percent for isopropyl alcohol, 15 to 20 volume percent for secondary butyl alcohol and 15 to 20 volume percent for tertiary butyl alcohol.

For optimal fractionation of raw, unmodified starch, the concentration of the starch in the aqueous alcohol mixture or solution should not exceed about 3 percent. At higher concentrations, the viscosity of the starch interferes with crystallization of the A-fraction and likewise causes difficulty in centrifuging operations. However, starch concentrations as high as 7 percent may be used, in accordance with the process of the present invention, although the products are not as pure as those obtained at lower concentrations.

When starch which has been modified to render it thin boiling, in accordance with the methods previously described, is fractionated, in accordance with the method of the present invention, the concentration of the starch in the aqueous alcohol mixture or solution may be considerably higher than in the case of raw unmodified starch. The fact that the starch is thin boiling makes it possible to operate at a higher concentration of the starch in the aqueous alcohol solution, without encountering the difficulties due to high viscosity. The concentration of thin boiling starch and white dextrine may be 17 percent or higher, depending upon the equipment available for separation. While it is possible to effect a solution of starch containing higher concentrations of starch than 17 percent, it is difficult to separate the precipitated fractions. The practicable upper limit of starch concentration is in the range of 15 to 17 percent. The lower limit is the same as for unmodified starch.

The A-fractions obtained from solutions having high concentrations of starch have lower iodine affinities than the products similarly obtained by fractionation of 3 percent solutions of unmodified starch. Due to the high concentration of starch, there is a higher concentration of B-fraction in the mother liquor contaminating the A-fraction. In such case, the A-fraction may be washed free of mother liquor by resuspending it in an appropriate alcohol-water medium followed by centrifugation.

The process of the present invention is readily adapted to a closed cycle operation and the alcohol-water mixture, after removal of the B-fraction, may be used as the medium for gelatinization and processing a fresh batch of starch.

The following examples which are intended as informative and typical only and not in a limiting sense will further illustrate the invention, which is intended to be limited only in accordance with the scope of the appended claims:

Iodine affinities referred to in the examples were determined by the method of Wilson, Schoch and Hudson (J. Am. Chem. Soc., 65, 1381 (1943)). Recovery of A-fraction was calculated as $$\frac{\text{Per cent yield of A-fraction} \times \text{iodine affinity of A-fraction}}{5.3}$$

wherein the value of 5.3 represents the iodine affinity of defatted whole corn starch. It is obvious that this formula can be employed only when there is definite evidence that fractionation has been effected, as indicated by the iodine affinities of the two fractions. The yield of B-fraction is equal to 100 percent minus the yield of A-fraction, less any mechanical losses.

*Example 1.*—Two hundred grams (on dry basis) of raw corn starch was suspended in a mixture of 4 l. of 1 percent sodium chloride solution and 1 l. of secondary butyl alcohol. The starch was gelatinized by heating, then the paste boiled for three hours under reflux, vigorous agitation being maintained during this period. The mixture was cooled to room temperature and the A-fraction collected in a supercentrifuge. The centrifugate was refrigerated overnight at 3 to 4° C. to flocculate the B-fraction. The supernatant solution was removed and used directly for processing of a second batch of starch. Iodine affinities of the A-fraction and B-fraction were 10.3 percent and 1.75 percent, respectively.

*Example 2.*—Two hundred and fifty grams of defatted corn starch was gelatinized in 10 l. of hot water and the resulting paste autoclaved for two hours at 20 pounds steam pressure to effect solution of the starch. After being cooled to 90° C., 2 l. of tertiary amyl alcohol was added to the solution, the hot mixture stirred for five to ten minutes, then passed through a supercentrifuge. The A-fraction deposited in the rotor of the centrifuge. The centrifugate containing the B-fraction was cooled to room temperature, then placed in the refrigerator overnight, the temperature reaching 3° C. The B-fraction separated as a curdy precipitate, from which the supernatant liquid was readily decanted and drained. Both fractions were dehydrated with alcohol, dried and analyzed for iodine affinity.

Yield of A-fraction=30 per cent
Yield of B-fraction=70 per cent (by difference)
Iodine affinity of A-fraction=15.4 per cent
Iodine affinity of B-fraction=0.56 per cent
Fractionation efficiency=87 per cent (of theory)

*Example 3.*—One hundred grams of raw corn starch (containing a normal amount of fatty acid) was gelatinized in a boiling mixture of 2 l. of water and 400 ml. of tertiary amyl alcohol. The pH value of the paste was adjusted to 6.45 with potassium phosphate buffer, then the paste was placed in a pressure vessel and heated for 30 minutes at 155° C. (110 lb. vapor pressure), the mixture being stirred during this operation. After cooling to approximately 90° C., the precipitated A-fraction was supercentrifuged, giving a dense paste of A-fraction. The supernatant solution was cooled and refrigerated, as in Example 2, causing flocculation of the B-fraction.

Yield of A-fraction=30 per cent
Yield of B-fraction=70 per cent (by difference)
Iodine affinity of A-fraction=12.5 per cent
Iodine affinity of B-fraction=0.99 per cent
Fractionation efficiency=71 per cent (of theory)

*Example 4.*—One hundred and eighty-five gallons of distilled water was heated to 190° F. in an autoclave having a capacity of 300 gals. Mixed phosphate buffer (97 g. $K_2HPO_4$–443 g. $KH_2PO_4$) was added to maintain the pH within limits of 5.9 to 6.3. Seventy pounds of commercial corn starch (calculated on dry starch basis) was suspended in 15 gallons of water and this mixture added slowly to the hot water in the autoclave, with continuous agitation to give a smooth paste. The latter was then autoclaved for two hours at 255° F. (15 lbs. internal pressure), then cooled to 180° F. and 55 gallons of 91 percent isopropyl alcohol added, under reflux. Agitation was continued during all these operations. The mixture was then allowed to cool to room temperature over a period of 48 hours and the precipitated A-fraction collected in a supercentrifuge. The centrifugate was returned to the autoclave and cooled to 40° F., by circulating cold well water through the jacket overnight followed by ice water for three to four hours. The system was stirred continuously during this cooling period. After flocculation of the B-fraction, cooling and agitation were discontinued and the precipitate allowed to settle for 16 hours. The supernatant solution was then drawn off and the precipitated B-fraction dehydrated with alcohol and dried.

On three batches of A-fraction prepared in the above manner, the iodine affinities were 11.4 percent, 11.8 percent and 10.8 percent; values for the corresponding B-fractions were 1.5 percent, 1.1 percent and 1.3 percent, respectively.

Yield of A-fraction=38, 39, 42 per cent
(crude material)     (respectively)

In a similar run, but using well water and starch at a concentration of 3 percent instead of 4 percent, the iodine affinities of the A- and B-fractions were 14.5 percent and 1.9 percent, respectively.

Yield of A-fraction=27 per cent

In a similar run using distilled water, 3 percent starch concentration and 0.5 percent common salt (to assist precipitation and flocculation), the fractions assayed 15.9 percent and 1.6 percent iodine affinity, respectively.

Yield of A-fraction=26 per cent

*Example 5.*—A thin boiling corn starch having a fluidity value of 75 (according to the method of Buel) was prepared in conventional manner by suspending corn starch in dilute sulfuric acid, heating for a period of time at a temperature below the gelatinization point of the starch, followed by neutralization, filtration and drying.

Two hundred and fifty grams (calculated on dry starch basis) of this 75 fluidity starch was suspended in two liters of water and 500 ml. of secondary butyl alcohol, containing 20 g. of sodium chloride. The concentration of the starch in the aqueous alcohol mixture was 10 percent. The mixture was heated on a boiling water bath to the boiling point of the alcohol-water mixture with constant stirring for one hour. It was then allowed to cool overnight to room temperature during which time stirring was continued. The mixture was then passed through a laboratory centrifuge operating at 50,000 R. P. M. to separate the precipitated A-fraction. The A-fraction was dehydrated by stirring it into a large volume of methanol, filtering and drying to constant weight in a vacuum oven. The supernate from the centrifuge was refrigerated overnight at 3 to 4° C., whereupon the B-fraction precipitated as a compact curd. This was filtered, dehydrated with methanol and dried. The yield of A-fraction, calculated on a dry starch basis, was 46.8 percent. The iodine affinities of the A- and B-fractions, after being extracted with ethyl alcohol in a Soxhlet extractor, were 10.38 and 0.35, respectively.

*Example 6.*—Example 5 was repeated except 500 ml. of isopropyl alcohol was substituted for the secondary butyl alcohol. The yield of A-fraction was 36.2 percent. The iodine affinities of the A- and B-fractions were 12.90 and 1.11, respectively.

*Example 7.*—Example 5 was repeated except 600 ml. of normal propyl alcohol was substituted for the secondary butyl alcohol. The yield of A-fraction was 37.2 percent. The iodine affinities of the A- and B-fractions were 11.80 and 0.5, respectively.

*Example 8.*—Two hundred and fifty grams of 75 fluidity corn starch was suspended in a mixture of 1.5 liters of water and 375 ml. of secondary butyl alcohol, containing 15 g. of sodium chloride. The mixture was treated, in accordance with the procedure described in Example 5. The yield of A-fraction was 49.2 percent. The iodine affinities of the A- and B-fractions were 10.01 and 0.46, respectively.

*Example 9.*—Example 8 was repeated except 375 ml. of isopropyl alcohol was substituted for the secondary butyl alcohol. The yield of A-fraction was 40.0 percent. The iodine affinities of the A- and B- fractions were 11.13 and 1.59, respectively.

This is a continuation-in-part of application, Serial No. 748,349, filed May 15, 1947.

I claim:

1. The process of fractionating a material from the group consisting of thin boiling starches and white dextrines into its A- and B-fractions, which comprises effecting a solution of said material at elevated temperature in a mixture of water and aliphatic alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol containing from 1 to 5 atoms of carbon and capable of being dissolved in the aqueous phase of said mixture to the extent of about 10 to 15 volume percent at 0° C. and being present in the system to the extent of about 10 to about 35 percent of the volume of said mixture; the concentration of said material in said solution not exceeding about 17 percent.

2. The process of fractionating a material from the group consisting of thin boiling starches and white dextrines derived from corn starch, which comprises effecting a solution of said material at elevated temperature in a mixture of water and aliphatic alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol containing from 1 to 5 atoms of carbon and capable of being dissolved in the aqueous phase of said mixture to the extent of about 10 to 15 volume percent at 0° C. and being present in the system to the extent of about 10 to about 35 percent of the volume of said mixture; the concentration of said material in said solution not exceeding about 17 percent.

3. The process of fractionating a material from the group consisting of thin boiling starches and white dextrines derived from potato starch, which comprises effecting a solution of said material at elevated temperature in a mixture of water and aliphatic alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol containing from 1 to 5 atoms of carbon and capable of being dissolved in the aqueous phase of said mixture to the extent of about 10 to 15 volume percent at 0° C. and being present in the system to the extent of about 10 to about 35 percent of the volume of said mixture; the concentration of said material in said solution not exceeding about 17 percent.

4. The process of fractionating a material from the group consisting of thin boiling starches and white dextrines derived from tapioca starch, which comprises effecting a solution of said material at elevated temperature in a mixture of water and aliphatic alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol containing from 1 to 5 atoms of carbon and capable of being dissolved in the aqueous phase of said mixture to the extent of about 10 to 15 volume percent at 0° C. and being present in the system to the extent of about 10 to about 35 percent of the volume of said mixture; the concentration of said material in said solution not exceeding about 17 percent.

5. The process of fractionating a thin boiling starch into its A- and B-fractions, which comprises effecting a solution of the starch at elevated temperature in a mixture of water and isopropyl alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol being present to the extent of about 20 to about 25 percent of the volume of said mixture; the concentration of said starch in said solution not exceeding about 17 percent.

6. The process of fractionating a thin boiling starch into its A- and B-fractions, which comprises effecting a solution of the starch at elevated temperature in a mixture of water and n-propyl alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol being present to the extent of about 25 to about 30 percent of the volume of said mixture; the concentration of said starch in said solution not exceeding about 17 percent.

7. The process of fractionating a thin boiling starch into its A- and B-fractions, which comprises effecting a solution of the starch at elevated temperature in a mixture of water and secondary butyl alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol being present to the extent of about 15 to about 20 percent of the volume of said mixture; the concentration of said starch in said solution not exceeding about 17 percent.

8. The process of fractionating a thin boiling corn starch into its A- and B-fractions, which comprises effecting a solution of the starch at elevated temperature in a mixture of water and secondary butyl alcohol, cooling the solution to a sufficiently low temperature to effect precipitation of the A-fraction, separating the A-fraction, cooling the solution remaining after removal of A-fraction to a sufficiently low temperature to effect precipitation of the B-fraction and separating the B-fraction; said alcohol being present to the extent of about 20 percent of the volume of said mixture; the concentration of said starch in said solution being about 10 percent.

9. The process of fractionating a material from the group consisting of thin boiling starches and white dextrines into its A- and B-fractions, which comprises effecting a solution of said material at elevated temperature in a mixture of water and isopropyl alcohol, cooling the solution to room temperature to effect precipitation of the A-fraction, separating the A-fraction, cooling the solution remaining after removal of the A-fraction to about 1 to 4° C. to effect precipitation of the B-fraction; said alcohol being present to the extent of about 20 to about 25 percent of the volume of said mixture; the concentration of said material in said solution not exceeding about 17 percent.

10. The process of fractionating thin boiling corn starch into its A- and B-fractions, which comprises effecting a solution of starch at elevated temperature in a mixture of water and isopropyl alcohol, cooling the solution to room temperature to effect precipitation of the A-fraction, separating the A-fraction, cooling the solution remaining after the removal of A-fraction to about 3 to 4° C. to effect precipitation of the B-fractions; said alcohol being present to the extent of about 20 percent of the volume of said mixture; the concentration of said starch in said solution being about 10 percent.

11. The process of fractionating thin boiling corn starch into its A- and B-fractions, which comprises effecting a solution of starch at elevated temperature in a mixture of water and n-propyl alcohol, cooling the solution to room temperature to effect precipitation of the A-fraction, separating the A-fraction, cooling the solution remaining after the removal of A-fraction to about 3 to 4° C. to effect precipitation of the B-fraction; said alcohol being present to the extent of about 23 percent of the volume of said mixture; the concentration of said starch in said solution being about 10 percent.

THOMAS JOHN SCHOCH.

REFERENCES CITED

The following references are of record in the file of this patent:

J. Soc. Chem. Ind., vol. 60, pp. 99–111 (1941).
Z. Physik. Chem. A188, pp. 137–159 (1941).
J. Am. Chem. Soc., vol. 65, pp. 1154–1157 (1943).
Hilbert et al., "Pea Starch, a Starch of High Amylose Content," J. of Biol. Chem., Feb. 1946, pp. 229–238, p. 231 pertinent.
Kerr, Chem. and Ind. of Starch, N. Y. 1944, pp. 129–151.